Patented June 13, 1939

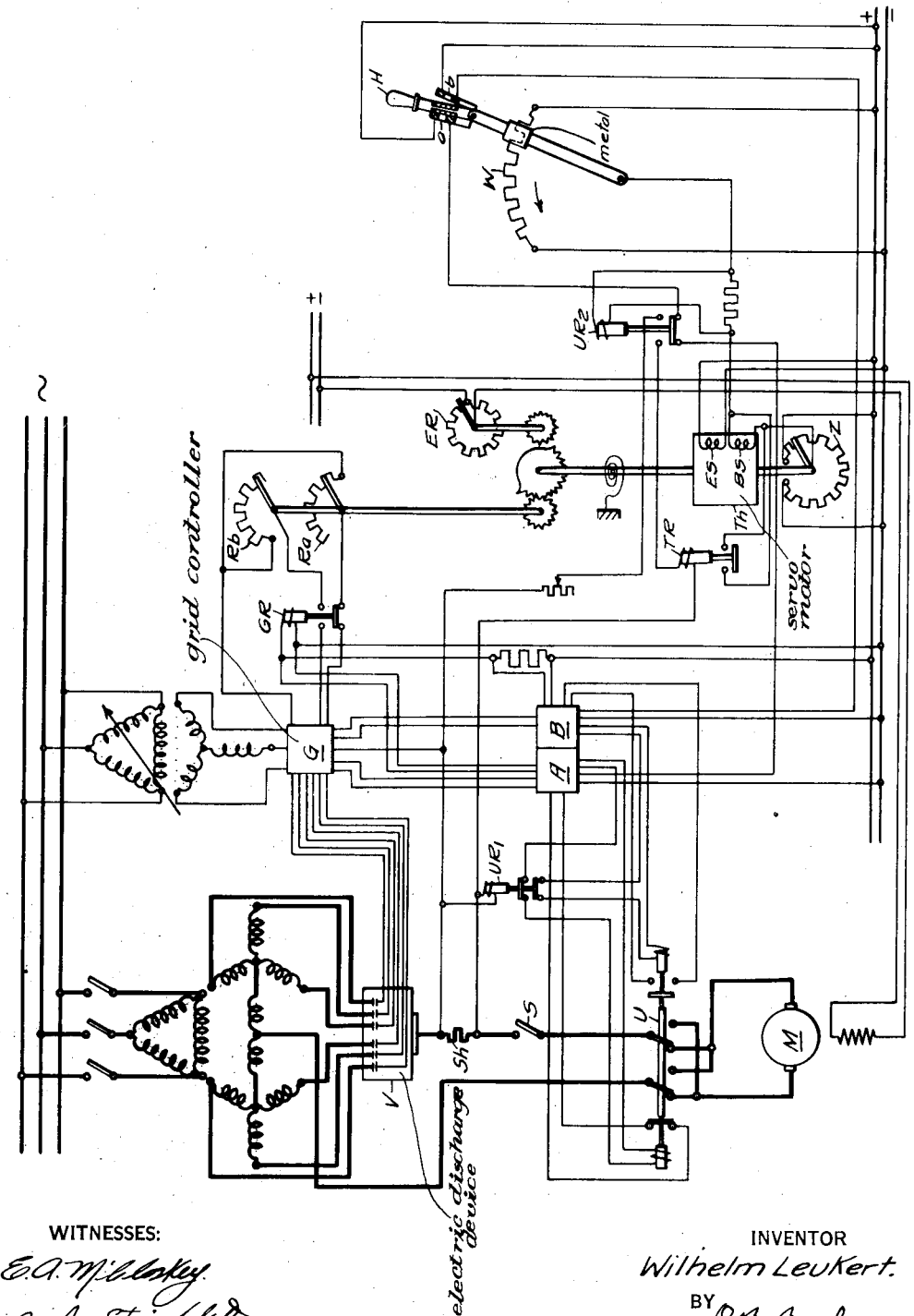

2,162,509

UNITED STATES PATENT OFFICE 2,162,509

ELECTRIC MOTOR DRIVE

Wilhelm Leukert, Berlin-Siemensstadt, Germany, assignor to Westinghouse Electric & Manufacturing Company, East Pittsburgh, Pa., a corporation of Pennsylvania Application February 26, 1937, Serial No. 127,907
In Germany February 29, 1936

6 Claims. (Cl. 172—179)

My invention relates to an electric motor drive and particularly to motor drives for metal working machines having large flywheel masses, the machines being driven by direct-current motors which are supplied with energy through controllable electric discharge devices.

In rolling mill drives operating with large flywheel masses, for instance, in a Perrins mill train drive it is necessary to reduce in operation the speed of the drive as rapidly as possible. This is readily possible in the case of Ward-Leonard converters, for by moving back the control lever the rolling mill motor operates as a generator and is thereby braked, so that even in the presence of large flywheels the speed may be relatively rapidly reduced. If the rolling mill motors are supplied with energy through electric discharge devices, i. e., if controllable arc discharge devices are employed for the conversion, the conditions are quite otherwise, unless two discharge devices are employed in the so-called cross-connection. If for economic reasons only one electric discharge device is employed in such drives, the electric discharge device becomes de-energized when moving back the control lever and a braking does not occur, since the electric discharge device is not capable of supplying back energy. In large flywheel drives the reduction of the speed will, therefore, require a very long time, since in this case great flywheel masses must run down. Since in such drives it is usual to speed up the same by weakening the field from a fundamental speed, which is attained by the grid control, to the corresponding operating speed, the field would be strengthened when moving back the control lever in the range within which the field is weakened in the case of a practical constant motor speed and in this case very high armature voltages occur corresponding to the degree of the field strengthening, whereby the armature winding is endangered.

The object of the present invention is to provide a driving arrangement which enables a regenerative braking in flywheel drives which are supplied with energy from an alternating-current supply circuit through controllable electric discharge devices preferably through grid-controlled arc discharge devices in exactly the same manner as is the case with Ward-Leonard drives and which may also be employed in reversible drives. An important feature of the invention consists in the fact that in the control circuit of the electric discharge device supplying the direct-current motor of the drive with energy from the alternating-current supply circuit are provided two separate control devices, one of which being employed for the rectifier operation, whereas the other for the inverter operation. The electric discharge device itself may be changed over on the direct-current side from rectifier operation to inverter operation or vice versa. Both control devices are always simultaneously actuated by the control lever serving to adjust the driving speed. However, only one control device is switched in, i. e., only one control device is connected to the grid circuit of the electric discharge device depending upon the desired direction of rotation of the drive. The other control device is put out of operation during this period. This arrangement of the control device of the electric discharge device has the advantage that only one discharge vessel is necessary, that, however, the driving arrangement retains nevertheless a substantial portion of the advantageous properties of the so-called cross-connection operating with two vessels; for owing to the fact that a particular control device is provided for each operation, i. e., for the inverter operation and the rectifier operation, and that both control devices are continuously adjusted directly or indirectly by the control lever the corresponding control device when changing over the electric discharge device on the direct-current side is at once available and above all properly adjusted. This is of particular importance if it is the case of braking heavy drives within the shortest possible time.

Another essential feature of the invention which is of considerable importance for metal working machines having large flywheel masses and which may be, therefore, taken advantage of, for instance, in connection with Perrins mill trains consists in the fact that locking devices are provided by means of which a change over to rectifier operation is prevented as long as the regulator is operated for strengthening the field. This locking device is essential to all drives in which both the armature voltage of the motor and the exciting current are varied for the purpose of regulating the speed. In most cases the corresponding control devices are designed in such a manner that at standstill the armature voltage is first increased to the full value and then the field of the motor is weakened. If these drives are equipped with the above-mentioned interlocking devices no unduly high motor voltages may occur even when operating the direct-current motors through electric discharge devices if the regulator is moved back, i. e., the field of the motor is strengthened. Any of the known control elements may be employed for the locking. At all events care should be taken that when moving back the control lever, i. e. during the field strengthening of the motor, only an inverter operation is possible and not a rectifier operation of the electric discharge device. The signal of the electric discharge device for changing over from inverter to rectifier operation must be prevented during this time. A particularly advantageous form for such a locking may be employed in a driving arrangement in which the control lever serving to adjust the speed of the drive does not directly act on the grid circuit or on the field but is connected through an electric lagging control with a regulator of limited regulating speed. In the circuit of this lagging control a supervisory relay may be inserted in this case which permits the changing over to rectifier operation when the regulator lever and the grid circuit regulator are in the same position.

A further essential feature consists in the fact that a current relay is arranged which interrupts the movement of the regulator when speeding up or braking in case the motor current or the braking current exceed a predetermined adjustable value.

In the accompanying drawing is shown an embodiment of my invention in diagrammatic form.

The electric discharge apparatus V is supplied with energy from the three-phase supply circuit through a corresponding transformer and is connected to the direct-current motor M through a high-speed switch S and the change-over switch U. The voltage control and, therefore, the speed control of the motor M is effected by a grid control with the aid of the control device G. For rectifier operation, the grid control device G is actuated by the regulator Ra and in the case of an inverter operation of the electric discharge device, i. e., during braking, the control device G is actuated by the regulator Rb. Both regulators are coupled and are so adjusted in common that for each armature voltage of the direct-current motor M the proper voltage is available both during inverter operation and during rectifier operation of the electric discharge device V. Both regulators are so adjusted that when moved they influence the grid in an opposite direction similarly as in the case of a cross-connection. Only one of the regulators may be effective depending upon whether the relay GR is attracted or released.

The control and the regulation of the speed are effected with the aid of the motor by the control lever H. Since owing to the large flywheel masses a gradually speeding up or braking is necessary, the grid control is not directly actuated by actuating the control lever H but through a servo-motor Th whose running period is capable of being adjusted. This servo-motor may, for instance, be an oil pressure regulator according to the principle of the Thoma regulator. This regulator should have two windings, an adjusting winding ES which maintains the equilibrium with respect to the pull of the spring so that the regulator is at rest when no current flows in the operating winding BS, and the operating winding BS which is inserted in the central branch of a Wheatstone bridge formed by the resistances W, Z. The resistance W is adjusted by the control lever H and is connected across the direct-current auxiliary voltage, the resistance Z is connected across an auxiliary voltage and is adjusted by the servo-motor Th. If the control lever H has another position than the crank in the resistance Z a current occurs in the operating coil BS, the equilibrium between the spring and the pull is disturbed and the governor is adjusted until the current in the operating winding BS attains the zero value, i. e., if the crank position of the resistance Z corresponds to the position of the control lever.

By means of the servo-motor Th the grid control regulators Ra and Rb are adjusted in common. If when the electric discharge apparatus V is completely controlled within the maximum range, the fundamental speed of the motor M is obtained no further adjustment of the grid regulators occurs; for as shown in the drawing the arcuate gear which is adjusted by the servo-motor is brought out of engagement with the corresponding gear of the grid control regulator and upon further adjusting the control lever H the arcuate gear is rotated a further amount by the servo-motor and is brought into engagement with the second gear which adjusts the exciting-current regulator ER. By adjusting this exciting-current regulator a weakening of the field occurs and the speed of the motor is increased to a further amount.

If now the speed is to be decreased, a contact b on the control lever H is closed upon moving back the latter, through which contact a signal is transmitted to the change-over device. This may be, for instance, carried out in such a manner that the control lever is provided with a pivot as shown in the drawing.

When moving the control lever in the forward direction the contact a is closed and in the backward direction the contact b is closed. Through the contact b and the change-over device B the rectifier is locked first through the grid control device G and through the relay GR the forward regulator Ra is switched out and the braking regulator Rb for inverter operation is switched in the circuit. Upon the locking of the grid the rectifier current disappears and the signal for changing over to the change-over switch U is transmitted as soon as the supervisory relay UR₁ is released, i. e., if no current is actually available. This additional supervision is convenient, since the change-over switch U should always be actuated only when deenergized. If the change-over switch U has been thrown into the "braking position" the change-over device B is disconnected through a dependence contact, thus annulling the locking of the grid. If the control lever H was within the range within which the field is weakened when passing over to braking, the electric discharge device after the change over is operated as an inverter through the contact device G and controlled within the maximum range. By moving back the control lever a further amount the exciting current regulator ER is rotated back so as to strengthen the field and, therefore, the voltage of the motor is increased till it is greater than the voltage of the inverted converter, thus causing a flowing back of the braking energy into the three-phase supply circuit. The speed of the motor drops under the influence of the braking and, therefore, the braking current becomes smaller. By rotating the control lever H a further amount the field is further strengthened until upon the attainment of the fundamental speed, the full field is available. When braking to a further extent the arcuate gear comes into engagement with the gear for the adjustment of the grid control regulator and the controlling range of the inverted converter is decreased. The further braking is effected with constant (full) field. If the braking is to be interrupted the control lever is moved forwards thus closing the contact $a$ which transmits the signal to the change-over device A. This signal for changing over is, however, only transmitted if the auxiliary relay UR₂ has not attracted its armature, which is the case if the position of the control lever and that of the crank on the regulator Z coincide so that the operating coil BS has no current. The grid control device G is locked through the reversible device A, the auxiliary relay GR again changes over the control device to the rectifier operation and transmits a change-over signal to the change-over switch U as soon as the electric discharge device has been deenergized. After the change-over has been effected the grid control is again released through a dependence contact and the machine M continues to operate as a motor.

In order to prevent, in the case of drives with very large flywheel masses, too great a surge of current from occurring both when speeding up the rolling mill motor and when braking upon too rapid an actuation of the control lever H, an auxiliary relay TR is provided which short-circuits the operating coil BS of the servo-motor Th as soon as the current of the electric discharge device exceeds an adjustable maximum value. By short-circuiting the operating coil BS an equilibrium between the pull of the spring and the adjusting coil ES is momentarily established, thus preventing the regulator from continuing its movement. If the intensity of current has dropped to a certain value, the auxiliary relay TR is again released, the operating coil BS again receives current, the governor causes a further regulation and if the current should again obtain the maximum value, the relay TR again attracts its armature. The process repeats itself until the crank Z and the control lever H assume the same position. The advantage of this arrangement consists in the fact that it only works in the case of an improper operation of the control lever.

I claim as my invention:

1. An electric motor drive comprising a reversible direct current motor, an alternating current supply circuit, a controlled vapor electric converter for transferring current between said motor and said circuit, control electrodes in said converter, two control devices adapted for supplying control potentials to said electrodes, one of said devices actuating said converter as a rectifier and the other as an inverter, means for simultaneously adjusting said control devices and means for selectively connecting said control devices to the control electrodes.

2. An electric motor drive comprising a reversible direct current motor, an alternating current supply circuit, a controlled vapor electric converter for transferring current between said motor and said circuit, control electrodes in said converter, two control devices adapted for supplying control potentials to said electrodes, one of said devices actuating said converter as a rectifier and the other as an inverter, means for simultaneously adjusting said control devices and means for selectively connecting said control devices to the control electrodes, means for adjusting the field strength of said motor, said means being interlocked with the adjusting means for said control devices whereby said field can only be controlled after maximum adjustment of said control devices.

3. A reversible motor drive comprising a reversible direct current motor, an alternating current supply, a multi-valve arc type converter for controlling current flow between said supply and said motor, a plurality of control devices for supplying control impulses to said converter, and manually controlled means for selectively connecting said control devices to said converter.

4. A reversible motor drive comprising a reversible direct current motor, an alternating current supply, a multi-valve arc type converter for controlling current flow between said supply and said motor, a plurality of control devices for supplying control impulses to said converter, and manually controlled means for selectively connecting said control devices to said converter, and means responsive to the position of said manual controlled means for simultaneously varying the operating condition of said control devices.

5. A reversible motor drive comprising a reversible direct current motor, an alternating current supply, a multi-valve arc type converter for controlling current flow between said supply and said motor, a plurality of control devices for supplying control impulses to said converter, and manually controlled means for selectively connecting said control devices to said converter, and means responsive to the position of said manual controlled means for simultaneously varying the operating condition of said control devices, and a speed regulating device interposed between said manual means and said control devices for controlling the rate of change of said control devices.

6. A variable speed electric motor drive comprising an alternating current supply circuit, a direct current motor, a single controlled vapor electric device for transferring electric energy between said motor and said circuit, control electrodes for regulating current flow in said converter, two control devices for supplying control potentials to said control electrodes, one of said devices supplying potentials for producing rectifier operation of said converter and the other for producing inverter operation, means for selectively connecting said control devices to said control electrodes, means for adjusting said control devices for regulating the current flow in said converter, a field winding in said motor, means for adjusting the field strength of said winding, actuating means for successively actuating said adjusting means for said control devices and the adjusting means for said field winding and manual means for controlling said actuating means.

WILHELM LEUKERT.